(12) United States Patent
Yeh et al.

(10) Patent No.: US 9,134,869 B2
(45) Date of Patent: Sep. 15, 2015

(54) TEST METHOD OF PRESSING A TOUCH PANEL

(71) Applicant: HengHao Technology Co. LTD, Taoyuan County (TW)

(72) Inventors: Chun-Yi Yeh, Taoyuan County (TW); Cheng-Hsiung Lee, Taoyuan County (TW)

(73) Assignee: Henghao Technology Co. Limited, Taoyuan County (TW)

( * ) Notice: Subject to any disclaimer, the term of this patent is extended or adjusted under 35 U.S.C. 154(b) by 105 days.

(21) Appl. No.: 14/102,487

(22) Filed: Dec. 10, 2013

(65) Prior Publication Data

US 2015/0160757 A1    Jun. 11, 2015

(30) Foreign Application Priority Data

Dec. 9, 2013    (TW) .............................. 102145048 A

(51) Int. Cl.
*G01N 3/04*    (2006.01)
*G01N 19/02*   (2006.01)
*G06F 3/044*   (2006.01)

(52) U.S. Cl.
CPC ...................... *G06F 3/044* (2013.01)

(58) Field of Classification Search
CPC ....................................................... G06F 3/041
USPC ............................................. 73/818; 345/173
See application file for complete search history.

(56) References Cited

U.S. PATENT DOCUMENTS

| 5,339,093 | A | * | 8/1994 | Kumagai et al. | 345/89 |
| 6,675,637 | B2 | * | 1/2004 | Saito | 73/104 |
| 6,956,563 | B2 | * | 10/2005 | Yamashita | 345/173 |
| 8,009,148 | B2 | * | 8/2011 | Chien | 345/173 |
| 8,857,804 | B2 | * | 10/2014 | Wang et al. | 269/111 |
| 9,003,892 | B2 | * | 4/2015 | Hou et al. | 73/818 |
| 2009/0241701 | A1 | * | 10/2009 | Pan | 73/865.9 |
| 2012/0146956 | A1 | * | 6/2012 | Jenkinson | 345/178 |
| 2012/0280934 | A1 | * | 11/2012 | Ha et al. | 345/174 |

* cited by examiner

*Primary Examiner* — Lisa Caputo
*Assistant Examiner* — Jamel Williams
(74) *Attorney, Agent, or Firm* — Donald E. Stout; Stout, Uxa & Buyan, LLP

(57) ABSTRACT

A test method of pressing a touch panel includes driving at least one pressing element such that a bottom surface of the at least one pressing element presses on a top surface of the touch panel. Pressing forces and corresponding pressing strokes are recorded while the touch panel is continuously pressed. The recorded pressing forces and the pressing strokes are converted into a test curve diagram, according to which a first turning point is determined at which the corresponding pressing force represents a force when the pressed touch panel contacts a test platform.

8 Claims, 2 Drawing Sheets

TEST METHOD OF PRESSING A TOUCH PANEL

BACKGROUND OF THE INVENTION

1. Field of the Invention

The present invention generally relates to a pressing test method, and more particularly to a test method of pressing a touch panel to obtain characteristic parameters of the touch panel being pressed.

2. Description of Related Art

Touch screens, as input/output devices that adopt sensing technology and display technology, have been widely employed in electronic devices such as portable or hand-held electronic devices.

A capacitor-based touch panel is a commonly used touch panel that utilizes a capacitive coupling effect to detect touch position. Specifically, capacitance corresponding to the touch position changes, and is thus detected, when a finger touches a surface of the touch panel.

A manufactured touch panel needs to be passed through a variety of tests before being delivered to a user. Among the tests, a pressing test is used to determine a pressing force and a corresponding pressing stroke when the touch panel makes contact with a test platform. In a conventional scheme, a touch panel under test is pressed until a bottom surface of the touch panel makes contact with a pressure-sensitive paper or red ink positioned below the touch panel. Test personnel decide that the touch panel has contacted the test platform when the pressure-sensitive paper changes color or the bottom surface of the touch panel is stained with red ink.

As the conventional test method requires observation by test personnel, test results vary with respect to different test personnel. Moreover, as the quality of the pressure-sensitive paper varies, test accuracy cannot be reliably predicted. A need has thus arisen to propose an objective and effective test method for accurately obtaining characteristic parameters of a touch panel being pressed.

SUMMARY OF THE INVENTION

In view of the foregoing, it is an object of the embodiment of the present invention to provide a test method of pressing a touch panel in order to obtain characteristic parameters such as a pressing force and corresponding pressing stroke when the pressed touch panel contacts the test platform.

According to one embodiment, a touch panel under test is provided with a plurality of elastic posts disposed on a bottom surface of the touch panel with bottom surfaces of the plurality of elastic posts being supported on a test platform. At least one pressing element is driven such that a bottom surface of the at least one pressing element presses on a top surface of the touch panel. Pressing forces exerted from the at least one pressing element and corresponding pressing strokes are recorded while the touch panel is continuously pressed. The recorded pressing forces and the corresponding pressing strokes are converted into a test curve diagram, and a first turning point of the test curve diagram is determined, at which the corresponding pressing force represents a force when the pressed touch panel contacts a test platform.

DETAILED DESCRIPTION OF THE INVENTION

Figure 1:
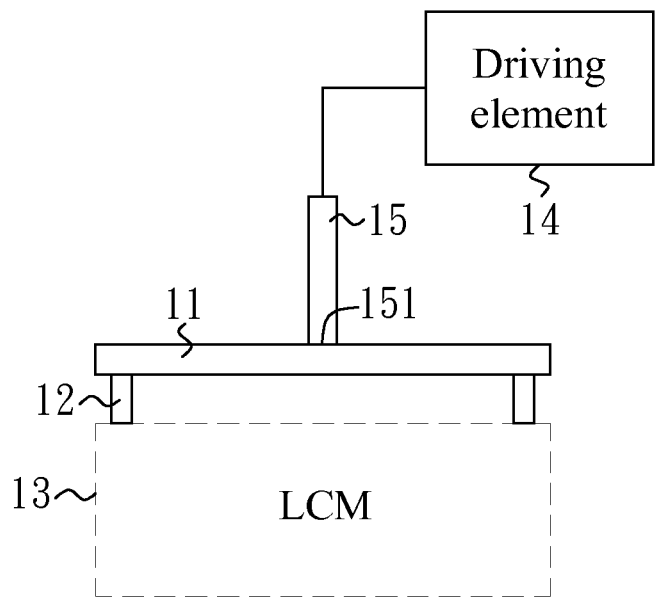
FIG. 1 shows a lateral view of a pressing test setup according to one embodiment of the present invention.

Referring more particularly to the drawings, the side view of FIG. 1 shows a pressing test setup 100 according to one embodiment of the present invention for testing a touch panel 11 in order to obtain characteristic parameters of the touch panel 11 being pressed. In the embodiment, a number of elastic posts 12 are disposed on a periphery (e.g., four sides) of a bottom surface of the touch panel 11. Bottom surfaces of the elastic posts 12 may contact a display module 13, such as a liquid crystal module (LCM). The elastic posts 12 may be made of elastic material such as a sponge material. During testing, a rigid and planar test platform 16 (FIG. 2A/FIG. 2B) may be used in lieu of the display module 13. As used herein and as should be clear from the contexts, the terms "below" and "bottom" denote directions with respect to the display module 13.

The pressing test setup 100 of the embodiment may include at least one driving element 14 (e.g., a motor or other gearing element(s)) configured to drive at least one pressing element 15, such that a bottom end 151 of the pressing element 15 may press on a top surface of the touch panel 11. The pressing elements 15 have diameters approximately comparable to fingers, such that pressing behavior made by fingers may be realistically simulated. One pressing element 15 may be driven to press different locations on the touch panel 11. Alternatively, plural pressing elements 15 may be driven, e.g., sequenced or at the same time, to press plural locations on the touch panel 11.

While the pressing element 15 is pressing the touch panel 11, the touch panel 11 may be deformed downwardly such that a bottom surface of the touch panel 11 becomes a convex surface. At a given time, a distance between a lowest point and an original (non-pressed) point of the bottom surface of the touch panel 11 is defined as a pressing stroke. The pressing stroke at that time may be obtained directly from the driving element 14. In other words, the pressing stroke is equal to a relative distance between a driving position at the time and an original position of the driving element 14 (when the bottom end 151 of the pressing element 15 contacts the top surface of the touch panel 11, and the driving element 14 does not yet exert force on the pressing element 15).

Figure 2A:
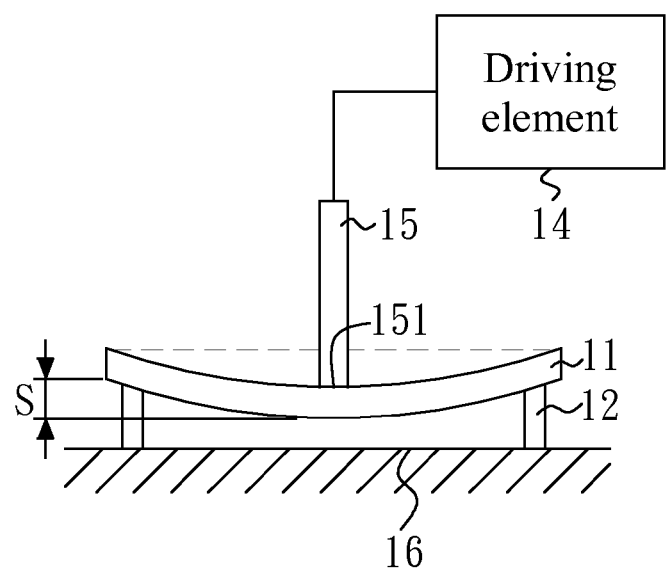
FIG. 2A and FIG. 2B show exemplary pressing strokes as the pressing element presses the touch panel.
Figure 2B:
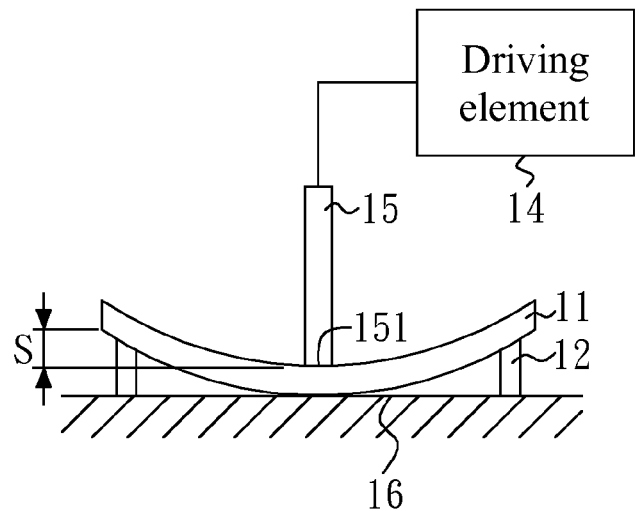

FIG. 2A shows an exemplary pressing stroke S as the pressing element 15 presses the touch panel 11. FIG. 2B shows a maximum pressing stroke S as the bottom surface of the touch panel 11 touches the test platform 16. Alternatively speaking, the maximum pressing stroke may be defined as a distance between an original (non-pressed) position of the bottom surface of the touch panel 11 and a top surface of the test platform 16.

Pressing forces (in unit of kilogram, for example) exerted on the touch panel 11 and corresponding pressing strokes S (in unit of millimeter, for example) may be obtained while the driving element 14 is continuously driving the pressing element 15.

Figure 3:
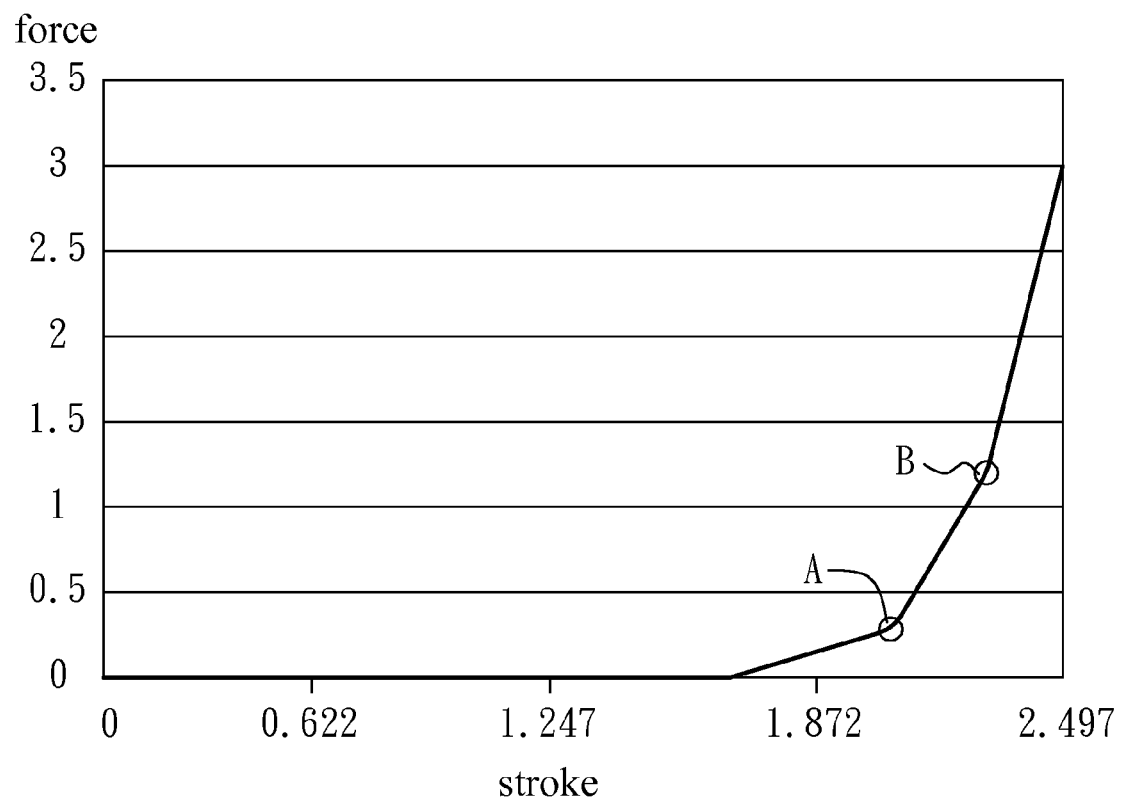
FIG. 3 shows an exemplary test curve diagram corresponding to test data obtained using the pressing test setup of FIG. 1.

FIG. 3 shows an exemplary test curve diagram corresponding to test data obtained using the pressing test setup 100 of FIG. 1. The vertical axis represents the pressing force (in unit of kilogram) and the horizontal axis represents the pressing stroke (in unit of millimeter).

It is observed from the typical test curve diagram exemplified in FIG. 3 that there are at least two turning points—a first turning point A and a second turning point B. Preceding the first turning point A, rate of change (or slope) of the test curve is not noticeable. However, a remarkable rate of change may be noticed while passing the first turning point A. Afterwards, another remarkable rate of change will be noticed while passing the second turning point B. In the embodiment, the rate of change at the turning point may be greater than 0.76 kg/mm.

The pressing test demonstrated in FIG. 3 may be verified by a pressing test scheme. Specifically, a few drops of color ink (for example, red ink used for a whiteboard pen) are disposed on a top surface of the test platform 16 opposite the pressing element 15. The touch panel 11 under verification is pressed until a bottom surface of the touch panel 11 makes contact with the test platform 16, and the bottom surface of the touch panel 11 is thus stained with color ink. At this time, the pressing force and the corresponding pressing stroke correspond to the first turning point A mentioned above. Afterwards, the touch panel 11 is continuously pressed (that is, the driving element 14 exerts more force), therefore arriving at the second turning point B. Regarding the pressing force (in unit of kg), the second turning point B has a value greater than the first turning point A. Regarding the pressing stroke (in unit of mm), difference between the two turning points A and B is insubstantial. In other words, the rate of change (or slope) at the second turning point B is substantially greater than the first turning point A.

The reason for the aforementioned pressing stroke difference between the second turning point B and the first turning point A may be caused by unexpectedly compressing a protective head (not shown) covering the bottom end 151 of the pressing element 15. A non-rigid material (e.g., plastics), instead of a rigid material (e.g., metal), is commonly used to make the protective head covering the bottom end 151 in order to prevent from scratching the touch panel 11.

Accordingly, as the pressing stroke difference between the second turning point B and the first turning point A may, in fact, be caused by unexpectedly compressing the protective head covering the bottom end 151 of the pressing element 15, the value of the pressing stroke difference therefore cannot be contributed to the true pressing stroke of the touch panel 11. Therefore, the second turning point B should not be used to represent maximum pressing stroke and the corresponding pressing force. In other words, the first turning point A should represent true maximum pressing stroke and the corresponding pressing force of the touch panel 11. In the embodiment, material characteristics (e.g., compression ratio of the sponge material) of the elastic posts 12 may be further determined according to the true maximum pressing stroke and the corresponding pressing force.

Although specific embodiments have been illustrated and described, it will be appreciated by those skilled in the art that various modifications may be made without departing from the scope of the present invention, which is intended to be limited solely by the appended claims.

What is claimed is:

1. A test method of pressing a touch panel, comprising:
providing a touch panel under test, a plurality of elastic posts being disposed on a bottom surface of the touch panel and bottom surfaces of the plurality of elastic posts being supported on a test platform;
driving at least one pressing element such that a bottom surface of the at least one pressing element presses on a top surface of the touch panel;
recording pressing forces exerted from the at least one pressing element and corresponding pressing strokes while the touch panel is continuously pressed;
converting the recorded pressing forces and the corresponding pressing strokes into a test curve diagram; and
determining a first turning point of the test curve diagram, at which the corresponding pressing force represents a force when the pressed touch panel contacts the test platform.

2. The method of claim 1, wherein the plurality of elastic posts comprise sponge material.

3. The method of claim 1, wherein the at least one pressing element has a diameter approximately comparable to a finger.

4. The method of claim 1, further comprising a driving element configured to drive the pressing element.

5. The method of claim 4, wherein the pressing forces and the corresponding pressing strokes are obtained from the driving element.

6. The method of claim 1, wherein a maximum pressing stroke is defined as a distance between an original position of the bottom surface of the touch panel and a top surface of the test platform.

7. The method of claim 1, further comprising a verification step comprising the following steps:
disposing a few drops of color ink on a top surface of the test platform opposite the pressing element;
pressing the touch panel until the bottom surface of the touch panel is stained with the color ink, whereby at that time, the pressing force and the corresponding pressing stroke correspond to the first turning point; and
continuously pressing the touch panel and recording pressing forces and corresponding pressing strokes, thereby obtaining a second turning point.

8. The method of claim 7, wherein the second turning point has a rate of change substantially greater than the first turning point.

* * * * *